United States Patent
Fender et al.

(10) Patent No.: US 12,050,602 B2
(45) Date of Patent: *Jul. 30, 2024

(54) NON-DISRUPTIVE DYNAMIC AD-HOC DATABASE CATALOG SERVICES

(71) Applicant: Oracle International Corporation, Redwood Shores, CA (US)

(72) Inventors: Pit Fender, Union City, CA (US); Benjamin Schlegel, Merced, CA (US); Matthias Brantner, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 17/505,741

(22) Filed: Oct. 20, 2021

(65) Prior Publication Data

US 2022/0043820 A1 Feb. 10, 2022

Related U.S. Application Data

(63) Continuation of application No. 16/441,989, filed on Jun. 14, 2019, now Pat. No. 11,200,234.

(51) Int. Cl.
*G06F 16/2453* (2019.01)
*G06F 16/21* (2019.01)
*G06F 16/28* (2019.01)

(52) U.S. Cl.
CPC ...... *G06F 16/24542* (2019.01); *G06F 16/212* (2019.01); *G06F 16/284* (2019.01)

(58) Field of Classification Search
CPC .............................................. G06F 16/24542
See application file for complete search history.

(56) References Cited

U.S. PATENT DOCUMENTS

2010/0121863 A1\* 5/2010 Reed ................. G06F 16/68
707/758
2014/0095470 A1 4/2014 Chen et al.
(Continued)

OTHER PUBLICATIONS

Fender, U.S. Appl. No. 16/441,989, filed Jun. 14, 2019, Notice of Allowance and Fees Due, Sep. 17, 2021.
(Continued)

*Primary Examiner* — Van H Oberly
(74) *Attorney, Agent, or Firm* — Hickman Becker Bingham Ledesma LLP; Brian Miller

(57) ABSTRACT

Approaches herein transparently delegate data access from a relational database management system (RDBMS) onto an offload engine (OE). The RDBMS receives a database statement referencing a user defined function (UDF). In an execution plan, the RDBMS replaces the UDF reference with an invocation of a relational operator in the OE. Execution invokes the relational operator in the OE to obtain a result based on data in the OE. Thus, the UDF is bound to the OE, and almost all of the RDBMS avoids specially handling the UDF. The UDF may be a table function that offloads a relational table for processing. User defined objects such as functions and types provide metadata about the table. Multiple tables can be offloaded and processed together, such that some or all offloaded tables are not materialized in the RDBMS. Offloaded tables may participate in standard relational algebra such as in a database statement.

20 Claims, 8 Drawing Sheets

(56) References Cited

U.S. PATENT DOCUMENTS

| | | | |
|---|---|---|---|
| 2015/0379077 A1* | 12/2015 | Grosse | G06F 16/24542 |
| | | | 707/718 |
| 2019/0102346 A1 | 4/2019 | Wang et al. | |
| 2020/0394191 A1 | 12/2020 | Fender | |

OTHER PUBLICATIONS

Fender et al., U.S. Appl. No. 16/441,989, filed Jun. 14, 2019, Non-Final Office Action Issued May 26, 2021, May 26, 2021.

Palkar, et al., "Filter Before You Parse: Faster Analytics on Raw Data with Sparser", Proceedings of the VLDB Endowment, vol. 11, No. 11, dated 2018, 14 pages.

Mustard et al., "JumpGate: Towards In-Network Data Processing", dated 2019, 3 pages.

Kornacker et al., "Impala: A Modern, Open-Source SQL Engine for Hadoop", 7th Biennial Conference on Innovative Data Systems Research (CIDR'15) dated Jan. 4-7, 2015, 10 pages.

Balkesen et al., "RAPID: In-Memory Analytical Query Processing Engine with Extreme Performance perWatt", SIGMOD'18, Jun. 10-15, 2018, Houston, TX, USA, 13 pages.

Agrawal et al., "A Many-core Architecture for In-Memory Data Processing", MICRO-50, Oct. 14-18, 2017, Cambridge, MA, USA, 14 pages.

\* cited by examiner

NON-DISRUPTIVE DYNAMIC AD-HOC DATABASE CATALOG SERVICES

RELATED CASES

This application claims the benefit as a continuation of application Ser. No. 16/441,989, filed Jun. 14, 2019, the entire contents of which is hereby incorporated by reference. The applicant hereby rescinds any disclaimer of claim scope in the parent applications or the prosecution history thereof and advise the USPTO that the claims in this application may be broader than any claim in the parent application. Each of the following related cases is incorporated by reference in entirety:

U.S. patent application Ser. No. 14/673,560 MULTI-SYSTEM QUERY EXECUTION PLAN filed Mar. 30, 2015 by Khai Tran et al.

U.S. patent application Ser. No. 15/897,375 CODE DICTIONARY GENERATION BASED ON NON-BLOCKING OPERATIONS filed Feb. 15, 2018 by Pit Fender et al.

U.S. patent application Ser. No. 16/519,794 INFLUENCING PLAN GENERATION IN THE CONTEXT OF THE TWO PHASE QUERY OPTIMIZATION APPROACH filed Jul. 23, 2019 by Pit Fender et al.

FIELD OF THE INVENTION

The present invention relates to database scalability and workload distribution. Herein are techniques that more or less transparently accelerate and delegate data access from a relational database management system (RDBMS) onto an external offload engine.

BACKGROUND

There are several steps involved when a SQL query is executed against a database, especially:
1) Parsing of the query,
2) Semantic analysis of the query,
3) Compilation of a query execution plan (QEP),
4) Execution of the QEP, and
5) Returning of results.

According to the state of the art, execution planning (i.e. steps 2-3) typically involves database catalog (i.e. dictionary) services to look up descriptive metadata that is statistical and/or structural (e.g. schematic). The database catalog is a dictionary of database objects such as database tables, indices, views, functions and procedures, and access privileges. A typical relational database management system (RDBMS) implementation materializes database schema(s) according to database catalog(s) and organizes the schema(s) in a normalized form, including relational tables. During semantic analysis of a query, the referenced objects of the query, which could include tables, views, and/or functions are checked against a database catalog. If the referenced object is not schema qualified (i.e. scoped), a resolution step is necessary in which a referenced object is resolved. During the resolution step, the query optimizer first checks if there exists an object in the user's (e.g. application) schema and if not, the optimizer may fall back to check against the public (e.g. system) schema.

Another task of the semantic analysis is to check for access privileges of the database user for the referenced objects of the query. For each of those checks the database optimizer has to query the database catalog(s). One logical consequence of this approach is that, before a query can be issued, all objects referenced by the query must already be defined in a database catalog, which also means that the object (e.g. its data content) needs to be materialized.

For query offload engines there are many scenarios where that cataloged materialization approach poorly performs. For example, a database user does not directly connect to a query offload engine. Instead, the user connects to an RDBMS that intermediates between the use and an external offload engine that is attached to the RDBMS. For example, the user may only be provided with a query interface to which the user submits queries and expects final results back.

The state of the art does not support structured query language (SQL) for creating and/or referencing a relational table in an offload engine. Attempts to offload a relational table would likely entail extensive changes to the query optimizer of the RDBMS and/or to SQL itself. In other words offloading relational tables likely would be architecturally disruptive to the RDBMS itself.

DETAILED DESCRIPTION

Figure 1:
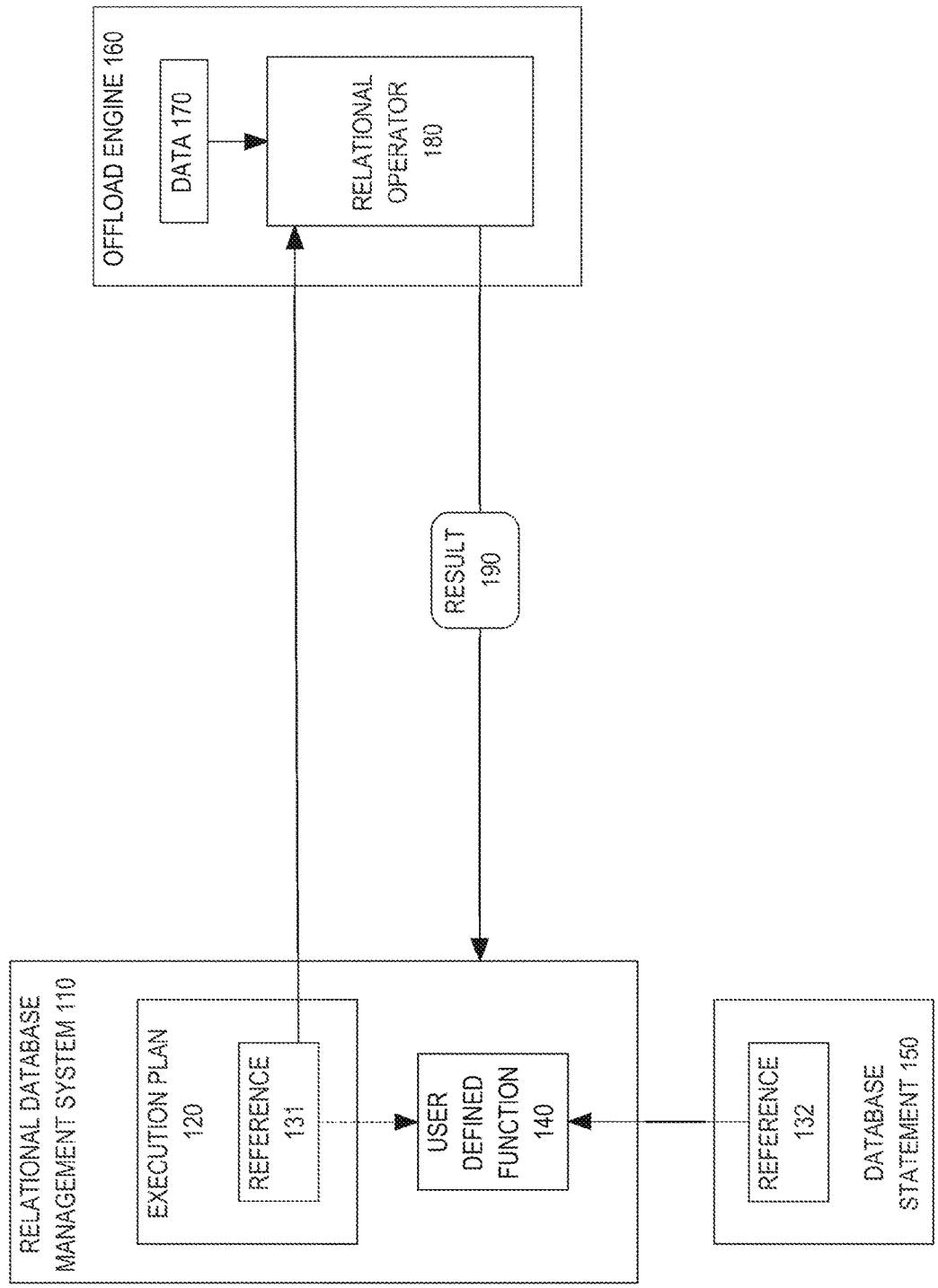
FIG. 1 is a block diagram that depicts an example computer cluster that transparently accelerates and offloads data access from a relational database management system (RDBMS)

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Approaches herein achieve database scalability and workload distribution by more or less transparently accelerating and delegating data access from a relational database management system (RDBMS) onto an external offload engine. Herein are novel implementation strategies for providing data and metadata binding for an offload engine based on various user defined objects such as tables, functions, and types. Emphasized herein are integration techniques that are non-invasive to preserve investment in RDBMS implementations and interface standards such as SQL.

Wither these techniques, there is no need to implement complex special purpose operators for important tasks such as content encoding. Instead of with custom operators, offloading tasks such as encoding can be achieved by reformulating them for solution by standard (e.g. SQL) operators of relational algebra that can be collectively offloaded. For example, many conventional relational operators are already fine-tuned for massive scale out, such as for Oracle Exadata smart scanning by distributed storage servers.

Some or all of the execution of a database statement may be delegated to an offload engine. Offloading is amenable to opportunistic (e.g. costed) optimization by an RDBMS. Optimized offloading may achieve performance improvements such as reduced network traffic (e.g. with compression as herein), horizontal and/or vertical scaling for acceleration, and/or reduced memory demand within the RDBMS. For example by offloading, a performance bottleneck may be pushed beneath (i.e. away from) the RDMBS onto a (e.g. somewhat idle) storage tier, thereby accomplishing better load balancing without purchasing more hardware.

In an embodiment, an RDBMS receives a database statement that contains a reference to a user defined function (UDF) in the RDBMS. Based on the database statement, the RDBMS generates an execution plan that contains the reference to the UDF. In the execution plan, the RDBMS replaces (e.g. during optimization) the reference to the UDF with an invocation of a relational operator in an external offload engine that is attached to the RDBMS. The RDBMS executes the execution plan to invoke the relational operator in the offload engine to obtain a result based on data in the offload engine. The RDBMS receives and processes the result that was based on the data in the offload engine. In other words, the RDBMS can bind a UDF to the offload engine, and almost all of the RDBMS may treat that UDF as an ordinary UDF, thereby transparently accelerating execution.

In an embodiment, the UDF is a table function that offloads a relational table for processing. The offloaded relational table may be undefined in all of the database dictionary(s) of the RDBMS, which is not problematic because herein are novel techniques involving user defined objects such as functions and types that provide statistical and/or structural (e.g. schematic) metadata about the offloaded relational table. Multiple relational tables can be offloaded and processed together, such that some (e.g. intermediate) or all offloaded tables are not materialized in the RDBMS and some can be materialized in the RDBMS. Offloaded relational tables may still participate in standard (e.g. SQL) relational algebra such as in a database statement from a client.

In an embodiment, UDF(s) and/or user defined types may be polymorphic (i.e. generic) to facilitate reuse, including concurrent sharing. Datatypes for use with user defined objects may be dynamic and discovered. For example, how many respective columns having which datatypes may be discovered for each offloaded relational table. Thus, very different offloaded tables may be manipulated by a same polymorphic user defined type or function. For example, a UDF may have a polymorphic signature with some polymorphic argument(s) and/or a polymorphic result.

1.0 Example Computer Cluster

FIG. 1 is a block diagram that depicts an example computer cluster 100, in an embodiment. Computer cluster 100 transparently accelerates and offloads data access from relational database management system (RDBMS) 110. Computer cluster 100 contains a (e.g. heterogeneous) plurality of networked computers (not shown) such as rack servers such as a blade, personal computers, mainframes, virtual computers, or other computing devices.

The (e.g. virtual) computers of computer cluster 100 are divided into RDBMS 110 and offload engine 160. RDBMS 110 contains relational database(s) (not shown) that contain relational table(s) of data records. In operation, RDBMS 110 receives database statements, such as 150, that are requests to access the data of the relational table(s). Database statement 110 may be textual commands such as data manipulation language (DML), such as for structured query language (SQL).

Database statement 150 may be manually entered, such as for ad hoc querying, or automatically generated such as by an object-relational mapping (ORM) software framework of a client application. Database statement 150 may scan, filter, and join data such as for data mining and online analytical processing (OLAP). Database statement 150 may isolate and mutate data such as for online transaction processing (OLTP).

RDBMS 110 may delegate some data access and processing for database statement 150 to offload engine 160. In some cases, offload engine 160 may contain data that database statement 150 needs, but that RDBMS 110 does not contain. In same or other cases, offload engine 160 may contain replicas of data also contained in RDBMS 110 that is more efficiently accessed and/or processed by offload engine 160.

In an embodiment, the computers of offload engine 160 are storage cells that are specialized for storage and/or transfer of bulk data. In an embodiment, offload engine 160 lacks non-volatile storage for data content and/or is not configured to use its non-volatile storage for data content. For example, offload engine 160 may be diskless and have only firmware and volatile scratch memory such as inexpensive dynamic random access memory (DRAM).

In any case, the computers of offload engine 160 have data manipulation logic for local scanning, filtration, encoding, and decoding of local data. Thus, RDBMS 110 may delegate some or all data processing for database statement 150 to offload engine 160. Thus, execution of database statement 150 may be accelerated. Techniques for integrating offload engine 160 with RDBMS 110 are presented in related U.S. patent application Ser. No. 14/673,560 now U.S. Pat. No. 10,585,887 MULTI-SYSTEM QUERY EXECUTION PLAN and U.S. patent application Ser. No. 16/519,794; now U.S. Pat. No. 11,061,901 INFLUENCING PLAN GENERATION IN THE CONTEXT OF THE TWO PHASE QUERY OPTIMIZATION APPROACH.

In an embodiment, offload engine 160 provides horizontal scaling by providing one or more computers for RDBMS 110 to exploit. In an embodiment, offload engine 160 provides vertical scaling by providing RDBMS 110 with at least one computer having higher throughput/bandwidth than the computer(s) of RDBMS 110 have. In a (e.g. compute cloud) embodiment, offload engine 160 provides horizontal elasticity by allocating additional computers with additional data replicas according to fluctuating demand of RDBMS 110.

Execution of database statement 150 may occur as follows. RDBMS 110 receives, parses, and semantically analyzes database statement 150. For example, RDBMS 110 may generate a parse tree that represents database statement 150 within computer memory of RDBMS 110. RDBMS 110 may decorate (i.e. annotate) the parse tree according to semantic analysis.

For example, database statement 150 contains reference 132 that specifies an invocation of user defined function (UDF) 140. Database statements, such as 150, may contain syntactic clauses such as for filtration, combination (i.e. joins), and projection of data. Although not shown, database statement 150 may contain multiple references, such as 132, to same UDF 140 and/or other UDFs in RDBMS 110.

Each syntactic clause may contain occurrences of operators and/or functions. Data operators are typically built in (i.e. predefined). Functions may be built in or custom (i.e. user defined) such as UDF 140. In an embodiment, UDF 140 is a member of a user defined type, such as discussed later herein.

Parsing of database statement 150 may detect reference 132 and generate, in a parse tree, a parse node that represents reference 132. Either parsing or semantic analysis may detect that reference 132 represents a function invocation. Semantic analysis may detect that reference 132 refers to a UDF generally and UDF 140 specifically. For example, semantic analysis may consult database dictionary(s) (not shown) that catalog reusable objects such as UDFs such as 140.

For example, a database dictionary may operate as a lookup table that expects a lookup key, such as a textual identifier, such as the name of UDF 140 as embedded in reference 132. Depending on the embodiment and/or the lifecycle state of a lookup entry, the lookup entry may contain raw (i.e. uncompiled) text of the logic of UDF 140, a compiled (e.g. executable) body of UDF 140, or a pointer (e.g. memory address) of the executable body of UDF 140. The lookup entry may instead or additionally contain metadata that describes UDF 140, such as a signature (i.e. argument types and return type).

In an embodiment, UDF(s) may be polymorphic (i.e. generic) to facilitate reuse, including concurrent sharing. Datatypes for use with some UDFs may be dynamic and discovered. For example, UDF 140 may have a polymorphic signature with some polymorphic argument(s) and/or a polymorphic result.

RDBMS 110 may, in the parse tree, replace or augment reference 132 with metadata or content of UDF 140 or otherwise mark reference 132 according to the metadata of UDF 140. In this example, UDF 140 is intended as a proxy (i.e. placeholder) for data that offload engine 160 provides. For example, metadata of UDF 140 may indicate that UDF 140 is a proxy for remote data access into offload engine 160. Accordingly, semantic analysis may mark the parse node of reference 132 as a proxy for remote data access into offload engine 160.

RDBMS 110 may use the parse tree, as decorated by semantic analysis, for query planning, optimization, and logic generation. RDBMS 110 may use the semantic analysis to generate multiple alternate query plans and/or structurally transform a query plan, such as execution plan 120, according to optimization heuristics as discussed later herein. Execution plan 120 specifies a combination of data operators whose application may fulfill database statement 150.

Execution plan 120 contains reference 131 that, like reference 132, specifies an invocation of UDF 140. Although not shown, RDBMS 110 may contain additional UDFs. Likewise, execution plan 120 may, depending on the database statement, contain multiple references, such as 131, that refer to same UDF 140 and/or different UDFs in RDBMS 110. RDBMS 110 marks reference 131 as a proxy for remote data access into offload engine 160, although reference 131 continues to refer to UDF 140. Thus, various (e.g. initial) phases of query planning and optimization may treat reference 131 as merely a UDF invocation, which minimizes how much of the logic of RDBMS needs adjustment to accommodate remote data access into offload engine 160.

For example, there is no need to expand a grammar of database statements to accommodate invasive enhancements such as optimizer hints or special (i.e. non-standard) lexical operators. That is significant because the external data access for UDF 140 actually delegates to special (e.g. proprietary) relational operator 180 that is implemented as logic within offload engine 160. Thus, RDBMS 110 is extensible with external facilities that are transparent to database statement 150 and much (e.g. most) of the logic of RDBMS 110.

For example, an author of database statement 150 need not know that reference 132 implies external functionality. Indeed, the author might be unaware that offload engine 160 exists. Although not shown, offload engine 160 may contain multiple relational operators, any or all of which may be invoked in fulfilment of a database statement.

Reference 131 may continue to be bound to UDF 140 during much or all of the execution planning for database statement 150. In an embodiment, backend logic (not shown) of RDBMS 110, such as a plan optimizer or code generator, may replace or retarget reference 131 to instead refer to relational operator 180. In another embodiment, reference 131 always refers to UDF 140, and UDF 140 itself delegates to relational operator 180.

In any case, when UDF 140 is actually invoked, or would have been invoked if not replaced, RDMBS 110 remotely invokes relational operator 180. In an embodiment, RDBMS 110 sends, to offload engine 160, an identifier of UDF 140, which offload engine 160 interprets as an invocation of relational operator 180. In another embodiment, RDBMS 110 translates the identifier of UDF 140 into an identifier of relational operator 180 that is sent to offload engine 160 to invoke relational operator 180.

In either case, relational operator 180 executes to access and/or process local data 170 to synthesize result 190 that offload engine 160 sends back to RDBMS 110 in fulfilment of UDF 140. RDBMS 110 may subsequently use result 190 in a standard way as if result 190 had originated within RDBMS 110. In other words, whether data 170 and relational operator 180 reside in offload engine 160 or in RDBMS 110 is almost entirely transparent to RDBMS 110 and database statement 150.

Thus, computer cluster 100 achieves location transparency and (e.g. horizontal) scalability. For example, RDBMS 110 and offload engine 160 may reside in separate virtual machines hosted by a same physical computer, or may reside in separate data centers. Likewise, computer cluster 100 achieves schematic transparency. For example, data 170 in the form of result 190 may be processed by RDBMS 110 in the same way as native relational data (not shown) of RDBMS 110. Thus, computer cluster 100 may be more or less unconcerned with which data is native to RDBMS 110 and which data is not. Thus, content and capacity for execution of database statements, such as 150, need not be limited by the natural capability of RDBMS 110. Thus, offload engine 160 quantitatively and/or qualitatively improves the performance of RDBMS 110.

2.0 Example Offloading Process

Figure 2:
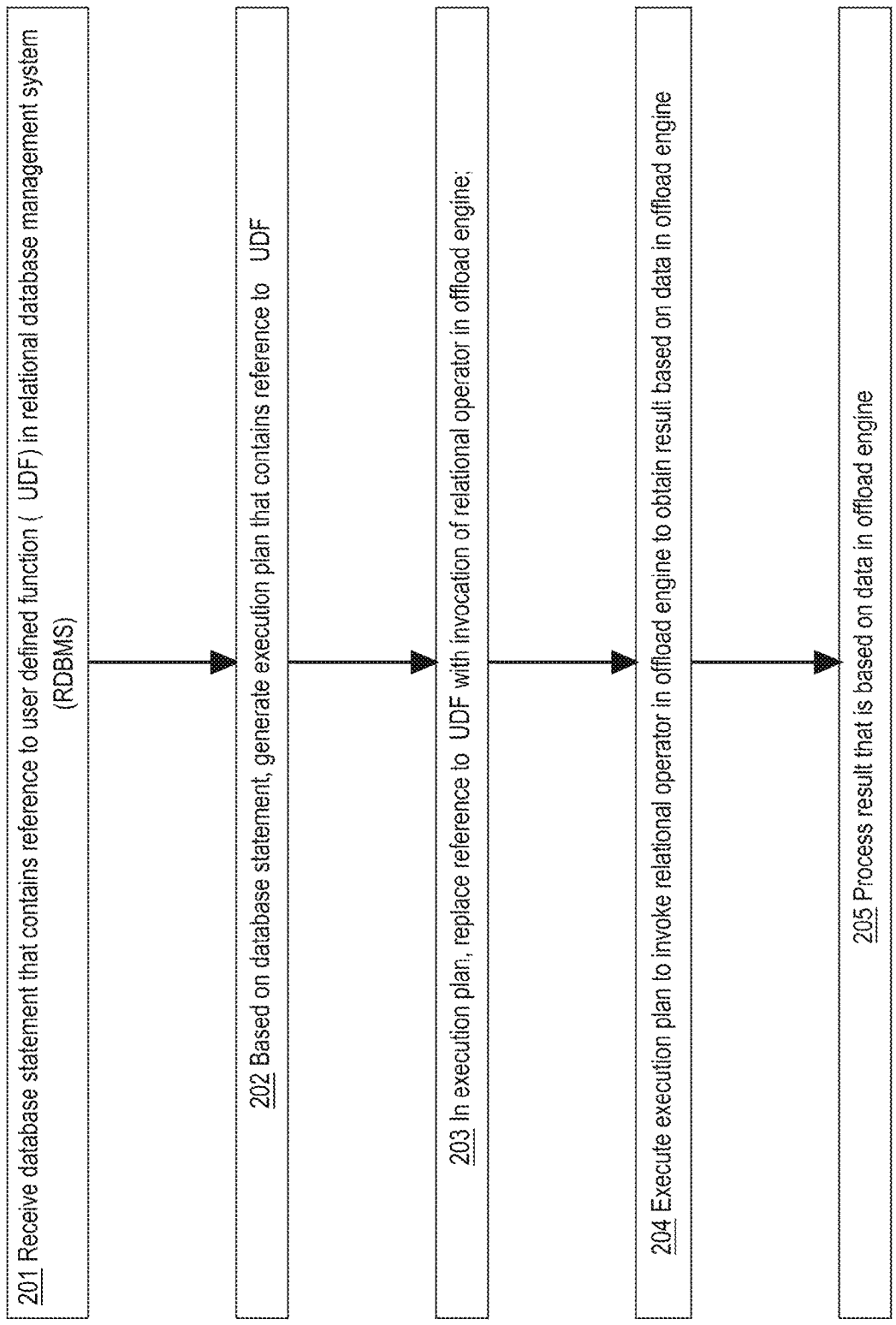
FIG. 2 is a flow diagram that depicts an example computer cluster process for transparently accelerating and offloading data access from a RDBMS.

FIG. 2 is a flow diagram that depicts computer cluster 100 transparently accelerating and offloading data access from RDBMS 110, in an embodiment. FIG. 2 is discussed with reference to FIG. 1. All of the steps of FIG. 2 are performed by RDBMS 110, although some steps involve interaction with offload engine 160.

Step 201 receives database statement 150 such as from a client or by internal generation. Database statement 150 refers to UDF 140 by reference 132. For example, database statement 150 may be a DML statement such as a SQL statement. A parse tree may be generated that represents received database statement 150. The parse tree may be semantically analyzed. For example, reference 132 may be marked for offloading, such as according to metadata of UDF 140.

Based on database statement 150 (e.g. and its semantically decorated parse tree) step 202 generates execution plan 120 that refers to UDF 140. Planning may occur in two phases, such as by two respective planners/optimizers (not shown). The first phase need not be aware of offload engine 160 and may treat reference(s) to UDF 140 as if UDF 140 were an ordinary UDF. The second phase occurs during step 203.

Techniques herein are non-intrusive, especially when all or almost all traditional optimizations occur in the first optimization phase that is part of a standard RDBMS product. Offload aware optimizations are encapsulated in the second optimization phase. As explained elsewhere herein, manipulations as or more complex than a subquery (e.g. as complex as a multidimensional OLAP cube with filtration, joins, and projection) may be offloaded, such as by the offload optimizer (i.e. second phase). Two phase optimization is discussed later herein.

Step 203 optimizes for a backend (i.e. second phase). As explained earlier herein, step 203 may detect which portions (e.g. subtrees or individual operators) of execution plan 120 cannot, might, or must be offloaded (i.e. delegated to offload engine 160). References to UDF 140 should be offloaded. Depending on the implementation, step 203 may handle references to UDF 140 in execution plan 120 by replacing those references with references to offloaded relational operator 180, or references to UDF 140 may remain if UDF 140 itself has logic that performs offloading.

Step 204 performs already-optimized execution plan 120. Regardless of how step 203 instrumented offloading, the offloading actually occurs during step 204. That is in step 204, RDBMS 110 invokes relational operator 180 within offload engine 160. Relational operator 180 access data 170 to generate result 190, which may be a scalar, a record, columnar, or tabular. Offload engine 160 sends result 190 to RDBMS 110 as fulfilment of the offloading.

Step 205 receives and processes result 190. Depending on database statement 150, RDBMS 110 may need to integrate (e.g. join) result 190 with native (e.g. relational table) data, or result 190 may more or less suffice as a final answer to database statement 150. In an case, result 190 may need reformatting such as transposing, converting, and/or transcoding before a final answer for database statement 150 is returned to the client.

3.0 Example Special Offload Process

Figure 3:
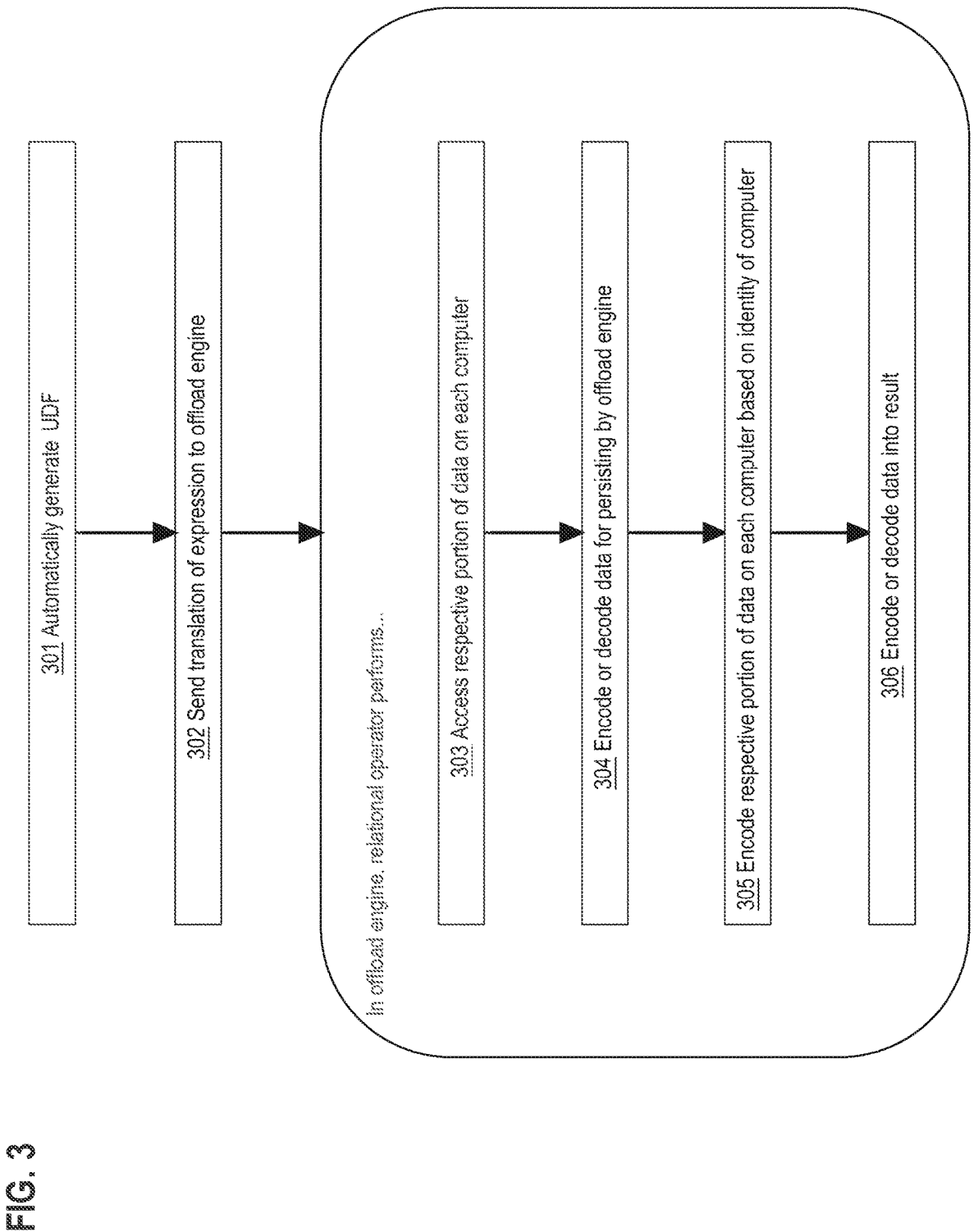
FIG. 3 is a flow diagram that depicts an example computer cluster process special offloading activities.

FIG. 3 is a flow diagram that depicts special activities of computer cluster 100, in an embodiment. FIG. 3 is discussed with reference to FIG. 1. Steps and their ordering shown in FIG. 3 are exemplary. Embodiments may lack, conditionally skip, or reorder those steps. Computer cluster 100 may be a system under load such that same or different steps in FIG. 3 may concurrently occur for different client sessions. For example, there may be multiple concurrent clients and/or multithreaded client(s).

Step 301 is preparatory. Depending on the embodiment, UDF 140 may be hand crafted or automatically generated by RDBMS 110. If UDF 140 is hand crafted, then it may be a predefined function that was originally bundled with RDBMS 110 or offload engine 160, and then deployed into RDBMS 110, such as with a data definition language (DDL) command. In an embodiment, offload engine publicizes relational operators, such as 180, in a machine readable format that RDBMS 110 can wrap by automatically generating proxies such as UDF 140, shown as step 301. After step 301, UDF 140 is more or less ready for use by clients, possibly with some lazy initialization (e.g. compilation) remaining, depending on the embodiment. Eventually, subsequent step 302 will finish any lingering lazy initialization.

Step 302 is stimulating and may cause occurrence of none, one, some, or all of steps 303-306. RDBMS 110 may receive a database statement, such as 150, that contains compound expression(s). For example, data 170 may represent colored pets, and database statement 150 may seek blue dogs and green cats. In an embodiment, offload engine 160 performs no filtration and returns all pets as result 190 for subsequent filtration by RDBMS 110. For example, database statement 150 may seek data that only resides in offload engine 160 and not in RDBMS 110, and database statement 150 may specify exotic filter operations that offload engine 160 does not support, or offload engine 160 might not support any filtration, or offload engine 160 might be momentarily oversubscribed (i.e. overwhelmed), in which case RDBMS 110 should not offload computationally intensive filtration.

In an embodiment, generation and/or optimization of execution plan 120 may be sensitive to absolute and/or momentary limitations and capabilities of offload engine 160. Thus, RDBMS 110 may automatically designate portions of execution plan 120 for delegated execution by offload engine 160. For example, execution plan 120 may be a logical tree of nested and/or cascaded operations, some of which may be selectively marked for offloading.

Such marking may be based on static constraints, such as a maximum amount of delegated operations per request to offload engine 160, or based on fluctuating conditions such as workload(s) of RDBMS 110 and/or offload engine 160. In an embodiment, RDBMS 110 has a planner that can generate equivalent alternate plans and/or an optimizer that can rate alternate plans and/or engage alternate backend implementations for various planned operations. In an embodiment, the optimizer makes cost based decisions. In an embodiment, costs are based on actual data statistics and/or performance measurements by RDBMS 110 and/or offload engine 160.

In an embodiment, execution plan 120 is a logical tree (not shown) of operation nodes, and multiple nodes and/or at least one subtree can be marked for offloading. For example, a compound expression (not shown) may be partially or totally offloaded in a same access request to offload engine 160. In an embodiment, operations from different lexical clauses of database statement 150 may be offloaded. For example, a filtration clause and a sorting clause may be offloaded together.

A typical embodiment does not offload clauses, expressions, or subexpressions verbatim. RDBMS 110 may reformulate any such expression(s) into a format that offload engine 160 accepts. For example, offload engine 160 may expect compound expressions to be delivered as a (e.g. ordered) set of individual relational operators (not shown) to apply, such as 180.

For example, offload engine 160 may expect operation tuples that each specify a relational operator, such as 180, an operator modifier, and/or a few arguments. For example, one tuple may specify targeting pets (i.e. data 170 instead of other external data), relational operator 180 may be a comparator for filtration, a not equals may be an operator modifier, and color green may be specified. An embodiment may expect densely encoded operation tuples. For example, objects within offload engine 160 such as datasets such as 170, relational operators such as 180, and/or fields/columns may be represented in operation tuples as enumeration ordinals or lookup table offsets.

Elements of execution plan 120, such as some portions of expressions, that absolutely cannot be offloaded or, according to cost, should not be offloaded, can instead be executed directly in RDBMS 110, such as after receiving result 190. No matter how an expression is formulated for offload engine 160, RDBMS 110 sends the expression in a data access request during step 302. That may cause offload engine 160 to apply specified relational operator(s) during steps 303-306 as follows.

In an embodiment, offload engine 160 contains multiple computers (not shown), such as for data partitioning, which RDBMS 110 may accommodate. For example, database statement 150 may seek a heaviest pet, which might be in any of multiple partitions, and thus in any of offload engine 160's multiple computers. Execution plan 120 may (e.g. after plan optimization) resolve to use a filtration operator that is dedicated to parallel scanning and concurrently available as relational operator 180 in all of offload engine 160's multiple computers.

That filtration operator may be partially implemented in RDBMS 110 and partially delegated to relational operator 180 in offload engine 160. For example, each offload computer may apply relational operator 180 to find a heaviest local pet, such that result 190 may occur as a flurry of local results for RDBMS 110 to integrate (e.g. filter further). For example, RDBMS 110 may subsequently detect which heaviest local pet actually is a globally heaviest pet in all of offload engine 160, which offload engine 160 by itself might be unable to detect. Thus, execution of seemingly simple reference 132 to UDF 140 may actually engage complex backend behaviors that entail fanout and/or fan-in, such as map/reduce with RDBMS 110 as a (e.g. sole) reducer, and/or mechanisms such as scatter/gather buffers in RDBMS 110. Such distributed data access into offload engine 160 is shown as step 303.

Step 304 transcodes content for volatile and/or nonvolatile storage in offload engine 160. For example, offload engine 160 may originally receive data 170 as a (e.g. read only) replica that is copied from RDMBS 110 that sends data 170 in a different format than offload engine 160 stores data 170. Embodiments of offload engine 160 may need to encode or decode received data 170 before storage, such as with a code dictionary and/or run lengths (RLE), such as for achieving compression and/or fixed size values. Embodiments of offload engine 160 may need to shred tabular data (e.g. records, row major) into a columnar (i.e. vector) format. In memory compression unit(s) (IMCU) and/or disk blocks may be involved.

Creation and use of sparse or dense code dictionaries, perhaps with unordered codes (i.e. lookup keys), has been reduced to relational algebra such as SQL, such that a code dictionary is itself a relational table whose creation and/or use may entail joins with other relational tables. Likewise, column shredding may entail projection such as with SQL. Some non-standard relational operators for relational algebra (e.g. SQL) may concisely express code dictionary construction and manipulation, such as taught by related U.S. patent application Ser. No. 15/897,375 CODE DICTIONARY GENERATION BASED ON NON-BLOCKING OPERATIONS.

Because those relational dictionary operators are non-standard, they may instead be provided as UDFs and used as taught herein. For example, dictionary transcoding during step 304 may be expressed directly in database statement 150, with reference 132 identifying a UDF 140 that connotes a relational operator 180 that is a non-blocking operation such as ENCODE FIRST. Relational dictionary construction may also entail a join and projection that, whether or not involving offload UDFs, may anyways be mapped to offloaded relational operators such as 180.

Thus, offload engine 160 may have a vocabulary of relational operators, such as 180, that may be indirectly invoked from database statement 150 (e.g. as UDFs or SQL relational operators), some of which are more or less dedicated to relational dictionaries. Because RDBMS 110 may offload much or all of database statement 150, database statement 150 may use a relational dictionary that exists only in offload engine 160 and whose creation and use RDBMS 110 must offload. Such relational dictionary creation and/or use may occur during step 304.

Step 305 may facilitate network routing. Offload engine 160 may contain multiple computers that each store a data partition, such as data 170. Partitioning may be content based, such as hashed. For convenience, or necessity such as with random or temporal or dynamically balanced partitioning, records in data 170 or especially result 190 may need to identify which offload computer hosts them. For example, a few high order bits of a primary key or of a dictionary code may identify an offload computer. Encoding or decoding by offload engine 160 and/or relational operator 180 may entail addition or removal of a computer identifier in each record, which may occur during step 305. In some cases, step 305 may actually precede or be combined with step 304.

Step 306 transcodes result 190 for sending to RDBMS 110. Techniques discussed for steps 303-305 may instead or additionally occur during step 306.

4.0 Example Offloaded Relational Table

Figure 4:
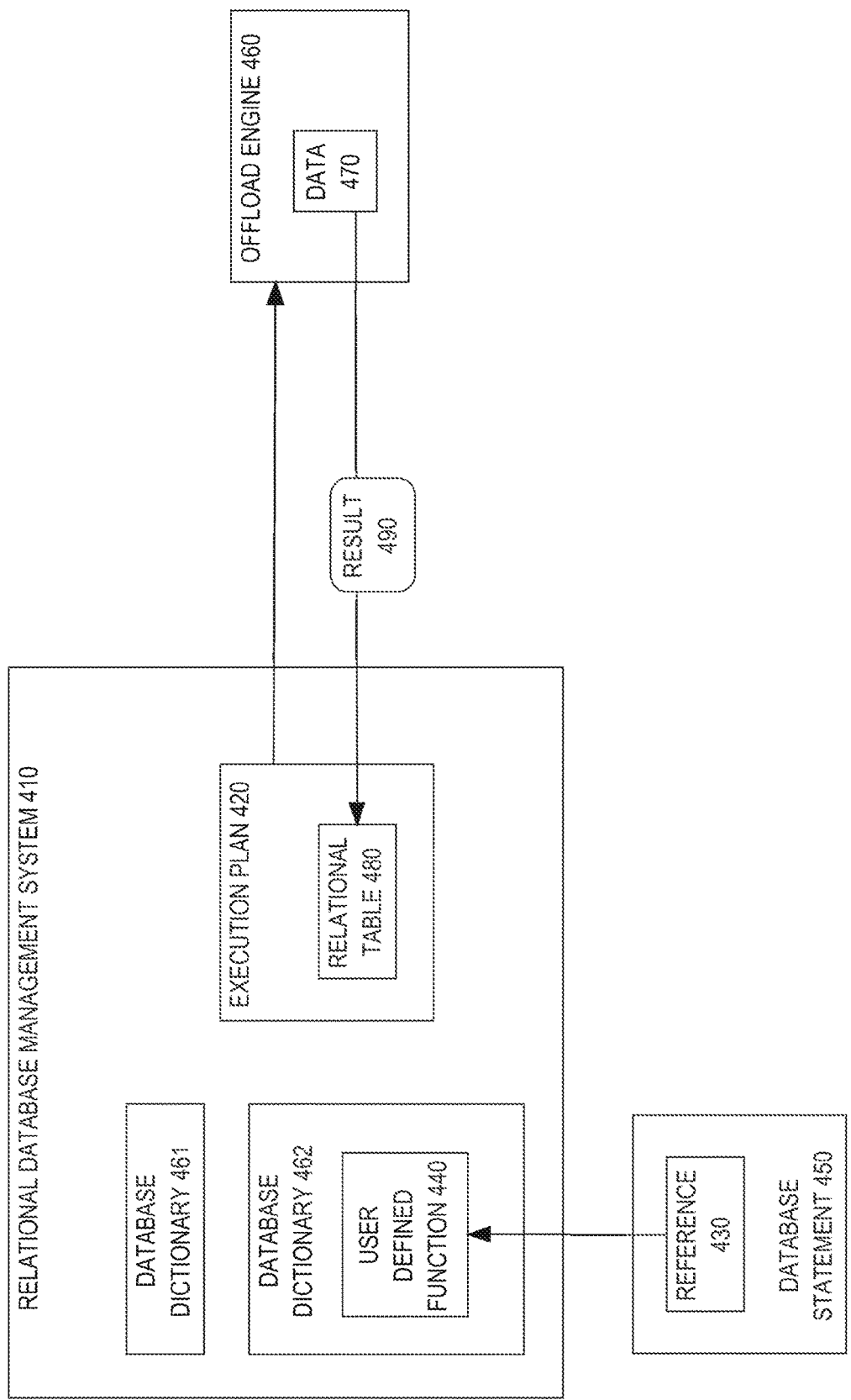
FIG. 4 is a block diagram that depicts an example computer cluster that processes an external result as if it were an ordinary relational table.

FIG. 4 is a block diagram that depicts an example computer cluster 400, in an embodiment. Computer cluster 400 processes an external result as if it were an ordinary relational table. Computer cluster 400 may be an implementation of computer cluster 100.

As explained above a database statement, such as 450, may appear to use a UDF, such as 440, by a reference such as 430. Also as explained above, execution of UDF 440 may be partially or completely replaced with execution of logic (not shown) in offload engine 460. External result 490 may be synthesized from external data 470 and received by RDBMS 410 for handling as if result 490 had originated within RDBMS 410.

RDBMS 410 has logic for promoting external result 490 as a first-class native relational table, such as 480, without needing to import result 490 into a full footprint of a heavy weight (e.g. durable and/or integral) table. Depending on the embodiment, some combination of the following features may be absent from relational table 480, including: a) durability guarantees such as persistence, segmentation into data (e.g. disk) blocks, row major formatting, and/or atomic consistent isolated durable (ACID) transactions, and/or b) schema enforcement such as indexing, relational consistency, and/or datatype checking. For example, relational table 480 may exist within RDBMS 410 solely as column vectors, in memory compression units (IMCU), and/or (e.g. network) buffers. In an embodiment, relational table 480 is read only.

No matter how incompletely implemented, relational table 480 is at least available to participate in relational algebra as a more or less first-class relational table. For example, relational table 480 may participate in queries and joins. In an embodiment, UDF 440 is a table function that returns relational table 480. In an embodiment, UDF 440 may be used as the argument of a table operator that provides relational table 480.

In embodiments, longevity of relational table 480 is limited to a lexical scope (e.g. subquery, parenthetical expression, or table operator) of reference 430 or limited to execution of database statement 450. For example, relational table 480 may materialize for execution of database statement 450, then dematerialize, and then rematerialize when another database statement references relational table 480 and/or references UDF 440. Depending on the embodiment, concurrent execution of a same or similar expression as the expression that includes reference 430, such as with repeated execution of database statement 450, may use a same instance or a more or less duplicate instance of relational table 480.

Because relational table 480 is operationally temporary (which may or may not be the same as a temporary table) and lexically isolated from database statements other than 450, performance overhead of cataloging relational table 480 in a database dictionary such as 461-462 of RDBMS 410 may be avoided. That is, relational table 480 may be more or less unlisted (i.e. unavailable) for lookup. Thus, relational table 480 need not occur in any database dictionaries of RDBMS 410, which is not problematic because database statement 450 does not refer to relational table 480 by name. Indeed, the SQL table operator does not require a name, although the table operator can accept a named table function, such as UDF 440, as an argument. Depending on the implementation, relational table 480 might not have a name.

For example, relational table 480 does not appear in any database schema (not shown). Absence of an express declaration within a schema is not problematic, because RDBS 410 (e.g. database dictionary 461 or 462) may have other object(s) that can dynamically describe relational table 480, as discussed later herein. For example, RDBMS 410 may dynamically discover datatypes, ordering, and/or names of columns of relational table 480. Depending on the embodiment, RDBMS 410 may or may not need such metadata during some or all of: loading UDF 440, parsing or executing database statement 450 and especially reference 430, invoking offload engine 460, receiving and unmarshalling result 490, and/or using relational table 480.

5.0 Example Table Offloading Process

Figure 5:
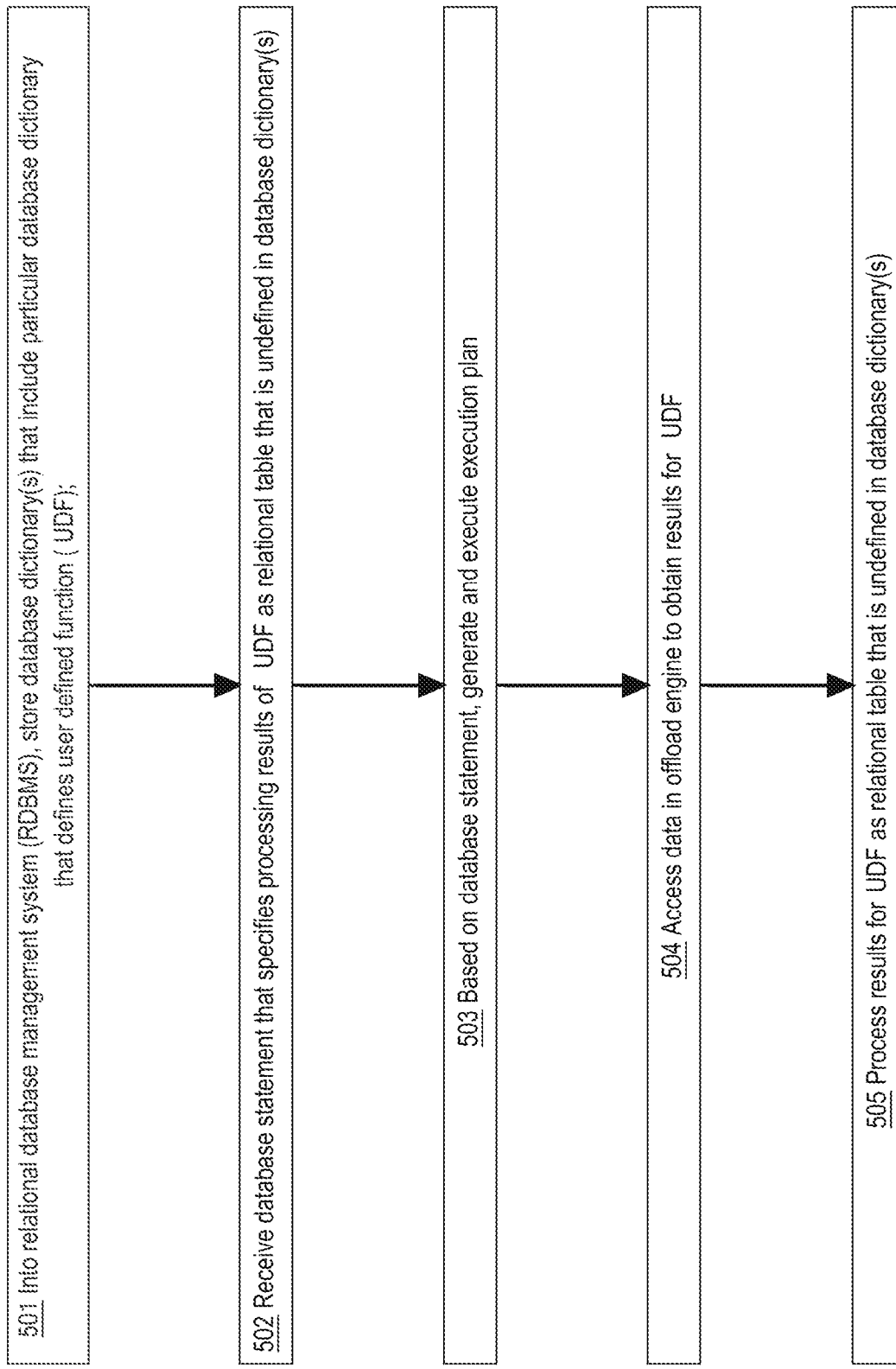
FIG. 5 is a flow diagram that depicts an example computer cluster process for processing an external result as if it were an ordinary relational table.

FIG. 5 is a flow diagram that depicts computer cluster 400 processing an external result as if it were an ordinary relational table, in an embodiment. FIG. 5 is discussed with reference to FIG. 4. All of the steps of FIG. 5 are performed by RDBMS 410, although some steps involve interaction with offload engine 460.

Step 501 is preparatory. In step 501, database dictionary(s) are stored that may be populated with descriptive metadata and/or pluggable implementations that may be looked up. One such database dictionary defines UDF 410, which may include such details as a signature of parameter types and a return type, source logic and/or compiled logic, and/or an indication that UDF 410 is for offloading.

The database dictionary may reside in volatile memory for fast access. The database dictionary may be specific to one database or application and intended to supplement (e.g. override) a system database dictionary. For example, database dictionaries may be daisy chained to achieve scoping.

Step 502 is stimulating and causes steps 503-505. In step 502, database statement 410 is received, such as from a client. Database statement 410 specifies processing result 490 of UDF 440 as if result 490 were a relational table, such as 480. However, relational table 480 may be undefined in all of the database dictionary(s) of RDBMS 410, such as database dictionaries 461-462. For example, database statement 450 may contain a table operator that takes reference 430 to UDF 440 as an argument.

Step 503 generates, optimizes, and performs execution plan 420, techniques for which are described elsewhere herein. Step 503 marks some or all of execution plan 420 for offloading (i.e. delegation to offload engine 460). Execution plan 420 includes establishing offloaded relational table 480 that may require schematic details (e.g. column datatypes) of relational table 480.

Because relational table 480 may be undefined in all database schemas and database dictionaries (e.g. 461-462) of RDBMS 410, a special mechanism may be needed for RDBMS 410 to discover schematic details of relational table 480. As discussed elsewhere herein, schematic discovery may entail UDF(s) and/or user defined type(s) that may be interrogated for schematic details.

In an embodiment, UDF(s) and/or user defined types are polymorphic (i.e. generic) to facilitate reuse, including concurrent sharing. Datatypes for use with user defined objects may be dynamic and discovered. For example, how many columns having which datatypes may be discovered for offloaded relational table 480. Thus, very different offloaded tables may be manipulated by a same polymorphic user defined type or function, such as UDF 440.

At a minimum, UDF 440 is marked in execution plan 420 for offloading. Depending on the embodiment as discussed herein, UDF 440 may be replaced in execution plan 420 with a reference to (e.g. an offloaded relational operator within) offload engine 460, such as during backend optimization, or UDF 440 remains in execution plan 420 because UDF 440, when invoked during performance of execution plan 420, directly causes offloading. In any case, performance of execution plan 420 causes delegation to offload engine 460.

In an embodiment, seamless integration of UDF 440 and offloaded relational table 480 into execution plan 420 may occur as follows. The optimizer of RDBMS 410 determines how and where the query or parts of the query are executed. That approach is denoted as two-phase query optimization approach (not shown).

Database statement 450 goes through the usual compilation stages run by a first optimizer, the RDBMSs optimizer. The RDBMs optimizer is aware of offload engine 460, and knows which tables are offloaded and how offloaded tables are partitioned. The RDBMS optimizer is aware of two cost models, its own and the cost model of offload engine 460, and is able to convert the costs of one cost model into the costs of the other cost model.

The RDBMS optimizer can analyze feasibility of execution plan 420 and can detect which offloaded operators does offload engine 460 support and how those offloaded operators can be utilized to satisfy the computational requirements of database statement 450. The RDBMS optimizer generates an initial version of execution plan 420 and marks some or all parts of execution plan 420 as activity to be delegated to offload engine 460. At that point optimization switches to a second compiler (i.e. optimizer), contained in RDBMS 410 on behalf of offload engine 460, that computes partial execution plans whose (e.g. combined) performance can be entirely delegated to offload engine 460.

Effectively, the first optimizer marks some plan fragments for offloading, and the second optimizer replaces those fragments with a specification of actual offloading. Techniques for such dual optimizers are presented in related U.S. U.S. patent application Ser. No. 16/519,794; now U.S. Pat. No. 11,061,901 INFLUENCING PLAN GENERATION IN THE CONTEXT OF THE TWO PHASE QUERY OPTIMIZATION APPROACH.

Step 504 accesses data 470 in offload engine 460 to obtain result 490 in satisfaction of UDF 440. For example, RDBMS 410 may send, to offload engine 460, a data access request that identifies (e.g. contains an identifier of): UDF 440, offloaded relational table 480, and/or element(s) of offload engine 460, such as an offloaded relational operator. Offload engine 460 satisfies the data access request by applying the identified relational operator(s) to data 470 to generate result 490, which may contain tabular data (e.g. row major or columnar vectors) and/or a reference (e.g. identifier) of a data aggregation (e.g. a table or columnar vector(s)) that result 490 represents. Result 490 more or less provides a return value for UDF 440.

Step 505 receives and processes tabular result 490. As explained earlier herein, whether result 490 is serialized (i.e. sent) to RDBMS 410 for materialization in RDBMS 410, or whether result 490 is consumed locally within offload engine 460 may depend on: a) the context that reference 430 appears within database statement 450, and/or b) (e.g. costed) optimizations of execution plan 420 by RDBMS 410. For example, table operators can be joined, nested, and/or embedded in a subquery, such that offloaded relational table 480 may merely be an intermediate table that is used only in offload engine 410.

For example, what is offloaded for database statement 450 may be more than reference 430 and relational table 480. For example, the data access request sent for database statement 450 may identify multiple offloaded relational tables and/or multiple offloaded relational operators. For example, it is possible that result 490 is a scalar value that does not even appear in data 470 nor in relational table 480. For example, result 490 may be a count of matching records, an average value of a column, or other derivative, such as a Boolean that answers an EXISTS query.

Thus, relational table 480 being shown as inside execution plan 420 may be merely symbolic (i.e. descriptive, such as metadata), such that offloaded relational table 480 is neither: materialized within RDBMS 410, nor based on whatever result 490 is actually sent back to RDMBS 410. Therefore, whether step 505 is performed by RDBMS 410 as shown in FIG. 4, or whether step 505 is instead performed by offload engine 460, depends on the context (e.g. usage scenario). Indeed and depending on fluctuating costs, repeated submission of same database statement 450 by a same or different client may experience different respective offloads. For example, sometimes relational table 480 is offloaded for database statement 450 and sometimes not.

6.0 Example Feature Selection Process

Figure 6:
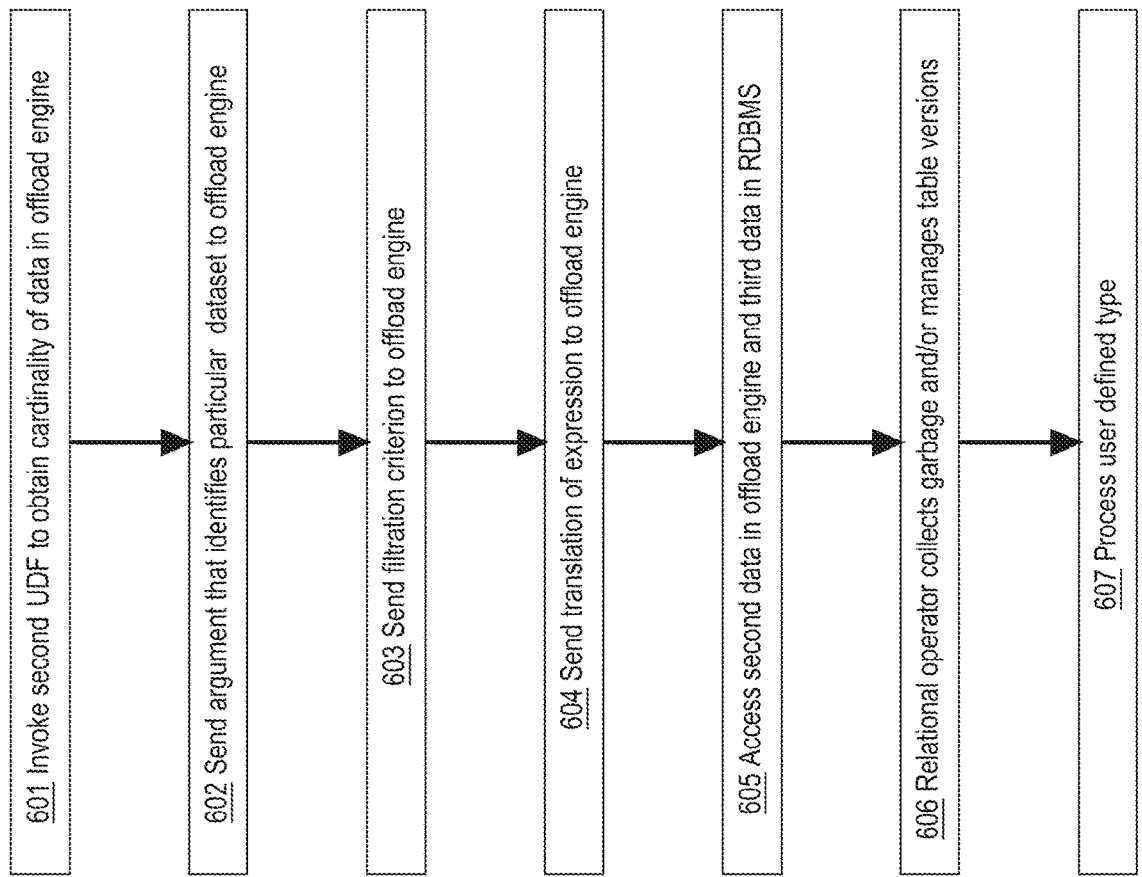
FIG. 6 is a flow diagram that depicts an example computer cluster process special offloading activities for a relational table.

FIG. 6 is a flow diagram that depicts special activities of computer cluster 400, in an embodiment. FIG. 6 is discussed with reference to FIG. 4. Steps and their ordering shown in FIG. 6 are exemplary. Embodiments may lack, conditionally skip, or reorder those steps. Computer cluster 400 may be a system under load such that same or different steps in FIG. 6 may concurrently occur for different client sessions. For example, there may be multiple concurrent clients and/or multithreaded client(s).

Step 601 may occur during execution planning, such as during generation or optimization of execution plan 420. For example, plan optimization may be based on data statistics of relational table 480 and/or external data 470. Data statistics may include cardinality, number of distinct values (NDV), and/or selectivity.

In some cases, database statement 450 may expressly access data statistics. In other (e.g. most) cases, data statistics are accessed only by the optimizer for making decisions such as offloading and/or rewriting. In an embodiment, relational tables (not shown) that are native to RDBMS 410 conform to, or are otherwise accompanied by, a statistics interface that may expose (e.g. only or at least to the optimizer) various data statistics, usage statistics, and/or performance statistics of that relational table.

In an embodiment, that statistics interface has first-class functions. In an embodiment, statistics of relational table 480 are accessible via additional UDFs (not shown) that may delegate, or be mapped to, a relational operator in offload engine 460, similar to how UDF 440 is bound to relational operator 470 as taught herein. Use of a statistical UDF by RDBMS 410 to read statistics of relational table 480 and/or external data 470 may occur during step 601.

In an embodiment RDBMS 410 may cache statistics of relational table 480 and/or external data 470 to avoid repeated networking to offload engine 460 for same statistics. For example, when relational table 480 and external data 470 are read only, cardinality cannot change and can readily be cached. In an embodiment, all external datasets, such as 470, and/or all offloaded relational tables, such as 480, may provide statistics through same shared statistical functions (e.g. UDFs) that may accept an argument that identifies which table or dataset. In an embodiment, statistical functions are predefined or (e.g. lazily) automatically generated.

Likewise, UDF 440 may be shared between many offloaded relational tables, such as 480. In an embodiment, UDF 440 accepts an argument that identifies which table or dataset to access. In an embodiment, RDBMS 410 sends that identifier to offload engine 460, such as in a data access request. Such sending an identifier may occur during step 602.

Steps 602-604 entail RDBMS 410 sending information (e.g. metadata such as an identifier) in a data access request to offload engine 460. Although steps 602-604 are shown as separate steps, when more than one of those steps occur, they are combined, and there is only one data access request. Thus, steps 602-604 are actually compatible variations, features, or aspects of a same step.

Offload engine 460 may provide various relational operators that may be used individually or in combination to offload filtration, as discussed earlier herein. For example, an Oracle Exadata storage server may provide a so-called smart scan according to criterion(s) sent in a data access request from RDBMS 410. That sending of criterion(s) may occur during step 603.

In some cases, a compound expression, lexical clause, or plan subtree may be partially or entirely offloaded. In an embodiment, some tables and their joins may be offloaded together, such as explained earlier herein for relational dictionary generation and/or use for dictionary coding. In some cases, most or all of database statement 450 may be offloaded.

For example, generation of offloaded relational table 480 may be based on an offloaded join and/or an offloaded subquery of (e.g. multiple) external datasets, such as 470. Thus, the data access request that RDBMS 410 sends may contain a compound expression for offload engine 460 to decompose. As explained earlier herein, RDBMS 410 may need to translate that compound expression into a format that offload engine 460 accepts. Sending that translated expression may occur during step 604.

As explained earlier herein, data distribution within computer cluster 400 may entail horizontal or vertical partitioning and/or replication of partition(s). For example, some partition(s) of a native relational table may be replicated in both of RDBMS 410 and offload engine 410, other partition(s) may be available only in RDBMS 410, and still other partitions may be stored only in offload engine 410 and possibly available to RDBMS 410 according to techniques herein. That is an example of a relational table that is all of: fully or partially offloaded, fully or partially stored in RDBMS 410 as a native table, and thus defined in a data dictionary of RDBMS 410 such as 461-462. As a different example entailing replication, with or without partitions, offloaded relational table 480 may be all of: non-materialized in RDBMS 410, undefined in database dictionaries, and an offloaded replica of another relational table (not shown) that is native (e.g. stored in RDBMS and defined in database dictionary) to RDBMS 410.

Thus, aggregation operations, such as MAX or self (i.e. reflexive) join, may span a mix of native and offloaded partitions of a same native relational table. However, same database statement 450 may need to specify different lexical constructs to access both external and native partitions of a same table. For example, a native partition may be directly accessed according to standard SQL relational operators, whereas an external partition should be indirectly accessed by nesting reference 430 for UDF 440 within a table operator, as taught herein. For example, the partitions may store pets, and seeking a globally heaviest pet may entail RDBMS 410 performing both of: scanning its own native partitions, and evaluating result 490 as returned by offload engine 460. That kind of hybrid activity entailing data access into both of RDBMS 410 and offload engine 460 may occur in step 605.

Step 606 achieves cleanup (e.g garbage collection) as follows. As explained earlier herein, offloaded relational table 480 need not be cataloged in any database dictionaries, such as 461-462, especially because relational table 480 has a lifespan somewhat similar to that of a subquery, which is narrowly lexically scoped and short lived. Especially because RDMBS 410 does not forward database statement 450 to offload engine 460, a lexical scope and/or relevance of offloaded relational table 480 may be unknown to offload engine 460.

Thus, offload engine 460 may be unable to detect when relational table 480 is no longer needed. In an embodiment, RDBMS 410 has additional UDF(s) (not shown) that, similar to 440, are bound to offloaded relational operators within offload engine 460, and reference to such an additional UDF (e.g. by a database statement such as 450) may expressly demark a point within execution plan 420 for offload engine 460 to release/deallocate/discard resources reserved within offload engine 460 for relational table 480.

For example such as with a relational dictionary in offload engine 460, a cascaded sequence of offloaded operations for same database statement 450 may generate intermediate relational tables whose use is limited to generating result 490 or some other transient external use entirely contained within offload engine 460. Likewise, same or different database statements may share a somewhat longer lived offloaded relational table whose content either mutates or otherwise evolves, such as by repeated regeneration/materialization. For example even if read only for RDBMS 410, offloaded relational table 480 may have multiple versions having (e.g. partially) overlapping lifespans.

That is, somewhat-concurrent different versions of a same offloaded relational table may be ready for discarding at different respective times that offload engine 460 may be naturally unaware of. Version expiration may be expressly demarked in a similar way to demarking table expiration as discussed above, both of which may be executed (e.g. resources actually deallocated) during step 606. For multiversion concurrency control (MVCC) databases a latest system change number (SCN) of an offloaded table may be stored in RDBMS 410 and/or offload engine 460.

RDBMS 410 performs step 607. Step 607 provides dynamic discovery of a schematic (i.e. logical) specification of relational table 480. Step 607 is shown as a last step, but RDBMS 410 may need the schematic functionality of step 607 at other times such as during semantic analysis of database statement 450, such as identification of primitive (i.e. built in) datatypes of columns of offloaded relational table 480.

As explained earlier herein, offloaded relational table 480 may be supported by a user defined type in RDBMS 410 that provides schematic discovery for relational table 480. In an embodiment, the same user defined type may be shared by many (e.g. all) offloaded relational tables, such that RDBMS 410 may use the user defined type to discover schema details of any offloaded relational table, such as 480, such as with identifiers of offloaded relational tables. In an embodiment, the user defined type(s) are predefined or (e.g. lazily) automatically generated.

In an embodiment, such a user defined type can be used to inspect schema details of an offloaded relational table, such as 480, without materializing that table. In an embodiment, RDBMS 410 can schematically inspect offloaded relational tables, such as by user defined type, without connecting to offload engine 460. Step 607 is instead shown as a last step after invoking offload engine 460 because RDBMS 410 may need schematic details of relational table 480 to process received result 490, such as for data conversions or transformations such as columnar to row major.

7.0 Example Implementation

The following formal examples may together form a cohesive example implementation that may be loaded into a (e.g. Oracle) RDBMS and exercised according to above techniques herein. FIGS. 1-6 may provide an overview of this implementation that provides a user-defined dynamic-schema table function to wrap an offloaded relational table. Schematic details of the offloaded relational table are looked up based on an identifier of the offloaded table. Dynamic schema table functions can be implemented through a public application program interface (API) of an Oracle RDBMS, known as the ODCI interface for user defined types. Another alternative is to utilize the concept of polymorphic table functions which recently have been introduced into the Oracle RDBMS. This example implementation is based on the more mature ODCI user defined typing.

The following many examples may differ from each other in that some are actually enabled (e.g. useful logic in bodies), some have trivial dummy logic that should be customized when embedding in a particular RDBMS product, and some are merely interfaces with signatures and no logic, which may be demonstrative or expecting lexical overriding.

7.1 Dynamic Schema Table Function

The example implementation is based on a user defined type and is implemented in PL/SQL. The definition of the user-defined type can be found later herein. The following ODCI member functions should be implemented.

static function ODCITableDescribe (record table out anytype, object number in number) return number: Here object number is the table identifier of the table to be wrapped. The type body for ODCITableDescribe can be found elsewhere herein. The idea here is to declare a cursor that queries the table metadata from the Meta-data Cache. In the example the RDBMS gets the meta data from two different places, the RDBMS catalog and the Meta-data Cache. That is just to show how it works. In practice the RDBMS catalog would not be queried, since the table would not be found there. All what needs to be done here is to alter the SQL statement and have it point to other GV$ tables or trusted user defined functions that are able to access the Meta-data Cache. The result of the cursor is fetched via a loop. As can be seen a record structure is filed out that points the columns of the relational schema of the wrapped table.

static function ODCITablePrepare (sctx out DBMS OFL ENGINE TABLE,
tab func info in sys. ODCITabFuncInfo, object number in number) return number:
The first parameter is the name of the user-defined type, the last parameter again is the table identifier of the table to be wrapped. The PL/SQL implementation can be found later herein.

static function ODCITableStart (sctx in out DBMS OFL ENGINE TABLE, object number in number) return number: The first parameter is the name of the user-defined type, the second parameter again is the table identifier of the table to be wrapped. The PL/SQL implementation can be found later herein.

member function ODCITableFetch (self in out DBMS OFL ENGINE TABLE, nrows in number, record out out anydataset) return number: The first parameter is the name of the user-defined type, the last parameter again is the table identifier of the table to be wrapped. The PL/SQL implementation can be found later herein.

member function ODCITableClose (self in DBMS OFL ENGINE TABLE) return number: The parameter is the name of the user-defined type. The PL/SQL implementation can be found elsewhere herein.

Additional to the above defined ODCI functions, the example implementation implements the following two more.

static function get typecode for sql type (sql type varchar2) return pls integer: This is a helper function needed to map the identifier for a data type to a string. This is only needed for this example implementation.

static function get (object number in number) anydataset pipelined using DBMS OFL ENGINE TABLE: This is the function that is actually called and referenced in a SQL statement, e.g. select <table name>.<column name> . . . from . . . table (some type. get(<object number>)) as <table name>.

As explained earlier herein, the table function execution operator is substituted with a base table access by the offload engine's query compiler. However in case the offload engine is shut down and therefore not active, the table function execution operator would not be substituted. That is why this example implementation can actually be executed. If invoked in such a non-active scenario it would return an empty row. However this could be modified to throwing an error or any other desired behavior. It is important to note that this example implementation would be also suitable to wrap tables that are actually known to the database catalog. That is, this technique could be used as a method to mark the table access of those tables for execution in the offload engine.

7.2 ODCISTATS Extensible Optimizer Interface

In order to mimic table access statistics by a table function wrapper, the example implementation utilizes the ODCIStats package. This is shown through a type declaration and the type body later herein. Shown here is how ODCITABFUNCSTATS can be set to return the cardinality of the wrapped table. A command later herein associates the user defined stats type with the dynamic schema table function type. Through this association the RDBMS optimizer will get proper access to the correct cardinality of the wrapped table instead of relying of a pre-defined value. By specifying the object number as the third parameter to the ODCIStatsTableFunction function, a metadata cache can be queried to return the correct cardinality for the table identifier passed in. The example implementation actually queries the cardinality as stored in the RDBMS catalog. As discussed above, this can be changed in an production implementation in favor of querying the metadata cache.

7.3 Type Definition of DBMS OFL Engine Table Type

Here is an example user defined type for exposing an offloaded relational table.

```
CREATE OR REPLACE TYPE DBMS OFL ENGINE TABLE AS
OBJECT (
/ storethetypesofthereturnedrows :
/
ROW TYPES ANYTYPE,
ROW WAS RETURNED NUMBER,
STATIC FUNCTION GET ( OBJECT NUMBER IN NUMBER)
RETURN ANYDATASET PIPELINED USING DBMS OFL
ENGINE TABLE ,
STATIC FUNCTION ODCITABLEDESCRIBE( RECORD TABLE
OUT ANYTYPE, OBJECT NUMBER IN NUMBER)
RETURN NUMBER,
STATIC FUNCTION ODCITABLEPREPARE ( SCTX OUT DBMS
OFL ENGINE TABLE ,
TAB FUNC INFO IN SYS . ODCITABFUNCINFO, OBJECT
NUMBER IN NUMBER) RETURN NUMBER,
STATIC FUNCTION ODCITABLESTART ( SCTX IN OUT DBMS
OFL ENGINE TABLE ,
OBJECT NUMBER IN NUMBER)
RETURN NUMBER,
MEMBER FUNCTION ODCITABLEFETCH ( SELF IN OUT
DBMS OFL ENGINE TABLE ,
NROWS IN NUMBER,
RECORD OUT OUT ANYDATASET)
RETURN NUMBER,
MEMBER FUNCTION ODCITABLECLOSE ( SELF IN DBMS
OFL ENGINE TABLE ) RETURN NUMBER,
STATIC FUNCTION GET TYPECODE FOR SQL TYPE ( SQL
TYPE VARCHAR2) RETURN PLS INTEGER
)
```

7.4 Wrapping Special Purpose Operators

Besides ad-hoc catalog services discussed earlier herein, here is a way to wrap special purpose operators that are part of an offload engine implementation. One example of a special purpose operator is the encode operator. The encode operator is designed for an encoding task for large scale-out scenarios. It is not part of the SQL standard and hence not part of a standard RDBMS operator repertoire. Therefore it will not be considered by the RDBMS optimizer. For all the reasons above it cannot be referenced in a SQL statement. As discussed the only known approaches to get around this would be to extend the SQL dialect or to introduce special optimizer hints. Both alternatives would involve extensive changes to the RDBMS optimizer. Almost all modules would need to be altered in particular: parser, semantic analysis, plan generator and code generator.

7.5 DBMS OFL Engine Table: Get Typecode for Sql Type

Here is an example for resolving precise datatypes when polymorphic (i.e. reusable) interfaces herein do not expressly declare types. For example, a datatype of a column of an offloaded relational table may need resolution (i.e. discovery).

```
CREATE OR REPLACE TYPE BODY DBMS OFL ENGINE TABLE
AS STATIC
...
FUNCTION GET TYPECODE FOR SQL TYPE ( SQL TYPE
VARCHAR2) RETURN PLS INTEGER
IS
TYPE CODE PLS INTEGER ;
BEGIN
CASE
WHEN SQL TYPE LIKE 'DATE' THEN
TYPE CODE := DBMS TYPES . TYPECODE DATE ;
WHEN SQL TYPE LIKE 'NUMBER' THEN
TYPE CODE := DBMS TYPES . TYPECODE NUMBER;
WHEN SQL TYPE LIKE 'CHAR' THEN
TYPE CODE := DBMS TYPES . TYPECODE CHAR;
WHEN SQL TYPE LIKE 'VARCHAR2 ' THEN
TYPE CODE := DBMS TYPES . TYPECODE VARCHAR2 ;
ELSE
TYPE CODE := DBMS TYPES . TYPECODE NUMBER;
END CASE ;
RETURN TYPE CODE ;
END;
...
END;
```

7.6 Example Offloaded Special Operators

The following are example special operators that are offloaded. Although they may be generally helpful for scanning, skimming, filtration, and translation, they are intended for generation and use of relational dictionaries for data codes, as explained earlier herein. These encoding operators may be readily implemented on any storage server that provides smart scanning. These example offloaded operators are exposed as aggregation functions. Another example may expose other offloaded operators as window functions.

ENCODE FIRST: The idea behind this flavor is to output the first column value of a grouping for a predefined aggregation column. A user may be introduced to a defined aggregation function denoted with ENCODE FIRST (column name). With ENCODE FIRST (column name), an aggregation function is specified where the tuples value for column name is stored into the bucket that is first seen. This value will be used as the aggregation functions result value for all other tuples of the same grouping.

ENCODE FLAG FIRST: This flavor determines if a given tuple is the first tuple in a new grouping, or if there have been tuples seen before with the same grouping criteria. The user defined aggregation function is denoted as ENCODE FLAG FIRST ( ) Its output is set to true if the current tuple is the first tuple in that grouping, and to false otherwise.

ENCODE SPARSE CODE: With this flavor a processing site local counter is incremented. The result is bit shifted and combined (bitwise or) with an identifier for the processing site. The user defined aggregation function is denoted as ENCODE SPARSE CODE(column name).

7.7 DBMS OFL Engine Table: ODCITABLEDESCRIBE

Here is an example user defined type for exposing an offloaded relational table. This type can describe and generate offloaded relational table(s) and is data driven by normalized metadata.

```
CREATE OR REPLACE TYPE BODY DBMS OFL ENGINE TABLE
AS STATIC
...
STATIC FUNCTION ODCITABLEDESCRIBE( RECORD TABLE
OUT ANYTYPE,
OBJECT NUMBER IN NUMBER)
RETURN NUMBER
IS
RECORD STRUCTURE ANYTYPE;
CURSOR COL CUR (OBJECTNUMBER NUMBER) IS
SELECT DISTINCT C . COLUMN NAME,
C . DATA TYPE ,
C . DATA LENGTH,
C . DATA PRECISION , C . DATA SCALE
FROM GV$OFL ENGINE GS COLUMN STATE G,
ALL TAB COLUMNS C , ALL OBJECTS O
WHERE G. COL NUM = C . COLUMN ID
AND G. OBJ NUM = O. OBJECT ID
AND O. OBJECT NAME = C . TABLE NAME
AND G. OBJ NUM = OBJECTNUMBER
ORDER BY G. OBJ NUM ;
BEGIN
ANYTYPE. BEGINCREATE( DBMS TYPES . TYPECODE
OBJECT , RECORD STRUCTURE ) ; FOR COL IN COL
CUR( OBJECT NUMBER)
LOOP
RECORD STRUCTURE . ADDATTR( ANAME => COL.
COLUMN NAME, TYPECODE => GET TYPECODE FOR SQL
TYPE (COL. DATA TYPE ) , PREC => COL. DATA PRECISION ,
SCALE => COL. DATA SCALE, LEN => COL. DATA LENGTH,
CSID => NULL, CSFRM => NULL ) ;
END LOOP;
RECORD STRUCTURE . ENDCREATE;
ANYTYPE. BEGINCREATE( DBMS TYPES . TYPECODE TABLE,
RECORD TABLE
) ;
RECORD TABLE . SETINFO (NULL, NULL, NULL, NULL, NULL,
RECORD STRUCTURE,
DBMS TYPES . TYPECODE OBJECT ,  0 ) ; RECORD TABLE .
ENDCREATE ( ) ;
RETURN ODCICONST . SUCCESS ;
EXCEPTION
WHEN OTHERS THEN
RETURN ODCICONST . ERROR;
END;
...
END;
```

7.8 DBMS OFL Engine Table: ODCITABLEPREPARE

This example creates, in an RDBMS, a representation of an offloaded relational table.

```
CREATE OR REPLACE TYPE BODY DBMS OFL ENGINE
TABLE AS STATIC
...
ODCITable Prepare creates an instance of DBMS OFL
ENGINE TABLE and returns it through thesctx
out parameter . /
STATIC FUNCTION ODCITABLEPREPARE( SCTX OUT
DBMS OFL ENGINE TABLE
,
TAB FUNC INFO IN SYS . ODCITABFUNCINFO, OBJECT
NUMBER IN NUMBER) RETURN NUMBER
IS
PREC PLS INTEGER ; SCALE PLS INTEGER ; LEN PLS
INTEGER ; CSID PLS INTEGER ; CSFRM PLS INTEGER ;
RECORD DESC ANYTYPE;
ANAME VARCHAR2( 3 0 ) ; DUMMY PLS INTEGER ;
```

```
BEGIN
DUMMY := TAB FUNC INFO . RETTYPE .
GETATTRELEMINFO( NULL, PREC , SCALE , LEN, CSID , CSFRM,
RECORD DESC, ANNE) ; SCTX := DBMS OFL ENGINE
TABLE ( RECORD DESC, 0 ) ; RETURN ODCICONST . SUCCESS ;
END;
. . .
END;
```

7.9 Body of DBMS OFL Engine Table Type

This example materializes (i.e. actually locally populates), in an RDBMS, an offloaded relational table. This activity entails content transmission from a storage (i.e. offload) tier to a system (i.e. RDBMS) tier and may be network intensive

```
CREATE OR REPLACE TYPE BODY DBMS OFL ENGINE
TABLE AS STATIC
. . .
STATIC FUNCTION ODCITABLESTART(
SCTX IN OUT DBMS OFL ENGINE TABLE , OBJECT NUMBER
IN NUMBER )
RETURN NUMBER
IS BEGIN
RETURN ODCICONST . SUCCESS ;
END;
MEMBER FUNCTION ODCITABLEFETCH(
SELF IN OUT DBMS OFL ENGINE TABLE , NROWS IN
NUMBER, RECORD OUT OUT ANYDATASET) RETURN
NUMBER
IS BEGIN
RETURN ODCICONST . SUCCESS ;
END;
MEMBER FUNCTION ODCITABLECLOSE( SELF IN DBMS OFL
ENGINE TABLE )
RETURN NUMBER
IS BEGIN
RETURN ODCICONST . SUCCESS ;
END;
END;
```

7.10 Type Definition of DBMS OFL Engine Table Stats Type

```
CREATE OR REPLACE TYPE DBMS OFL ENGINE TABLE STATS
AS OBJECT (
DUMMY ATTRIBUTE NUMBER,
/ following two methods are important for specifiying theright
cardinality to the optimizer /
STATIC FUNCTION ODCIGETINTERFACES (
P INTERFACES OUT SYS . ODCIOBJECTLIST ) RETURN
NUMBER,
STATIC FUNCTION ODCISTATSTABLEFUNCTION (
P FUNCTION IN SYS . ODCIFUNCINFO ,
P STATS OUT SYS . ODCITABFUNCSTATS, P ARGS IN SYS .
ODCIARGDESCLIST , OBJECT NUMBER IN NUMBER)
RETURN NUMBER
)
```

7.11 Body of DBMS OFL Engine Table Stats Type

```
CREATE OR REPLACE TYPE BODY DBMS OFL ENGINE TABLE
STATS AS STATIC FUNCTION ODCIGETINTERFACES ( P
INTERFACES OUT SYS . ODCIOBJECTLIST )
RETURN NUMBER
IS BEGIN
P INTERFACES := SYS . ODCIOBJECTLIST (
SYS . ODCIOBJECT ( 'SYS ' , ' ODCISTATS2 ' ) ) ; RETURN
ODCICONST . SUCCESS ;
END;
STATIC FUNCTION ODCISTATSTABLEFUNCTION ( P FUNCTION
IN SYS . ODCIFUNCINFO ,
P STATS OUT SYS . ODCITABFUNCSTATS, P ARGS IN SYS .
ODCIARGDESCLIST , OBJECT NUMBER IN NUMBER)
RETURN NUMBER
IS
NUMBER ROWS NUMBER;
BEGIN
EXECUTE IMMEDIATE 'selectdistinct t . num rows '
' from ALL TABLES t , ALL OBJECTS o '
' where t . owner = o . owner and t . table name =
' ' o . objectname and o . object id = '
OBJECT NUMBER INTO NUMBER ROWS;
P STATS := SYS . ODCITABFUNCSTATS(NUMBER ROWS) ;
RETURN ODCICONST . SUCCESS ;
END;
END;
ASSOCIATE STATISTICS WITH TYPES DBMS OFL ENGINE
TABLE USING DBMS OFL ENGINE TABLE STATS ;
```

7.12 Sql Statements for Triggering Different Flavors of Encode.

SELECT ENCODE FIRST(<column name>)
OVER (PARTITION BY<different column name (s)>)
FROM <table name>;
SELECT ENCODE FLAG FIRST OVER (PARTITION BY<column name>)
FROM <table name>;
SELECT ENCODE SPARSE CODE OVER (PARTITION BY<column name>)
FROM <table name>;

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
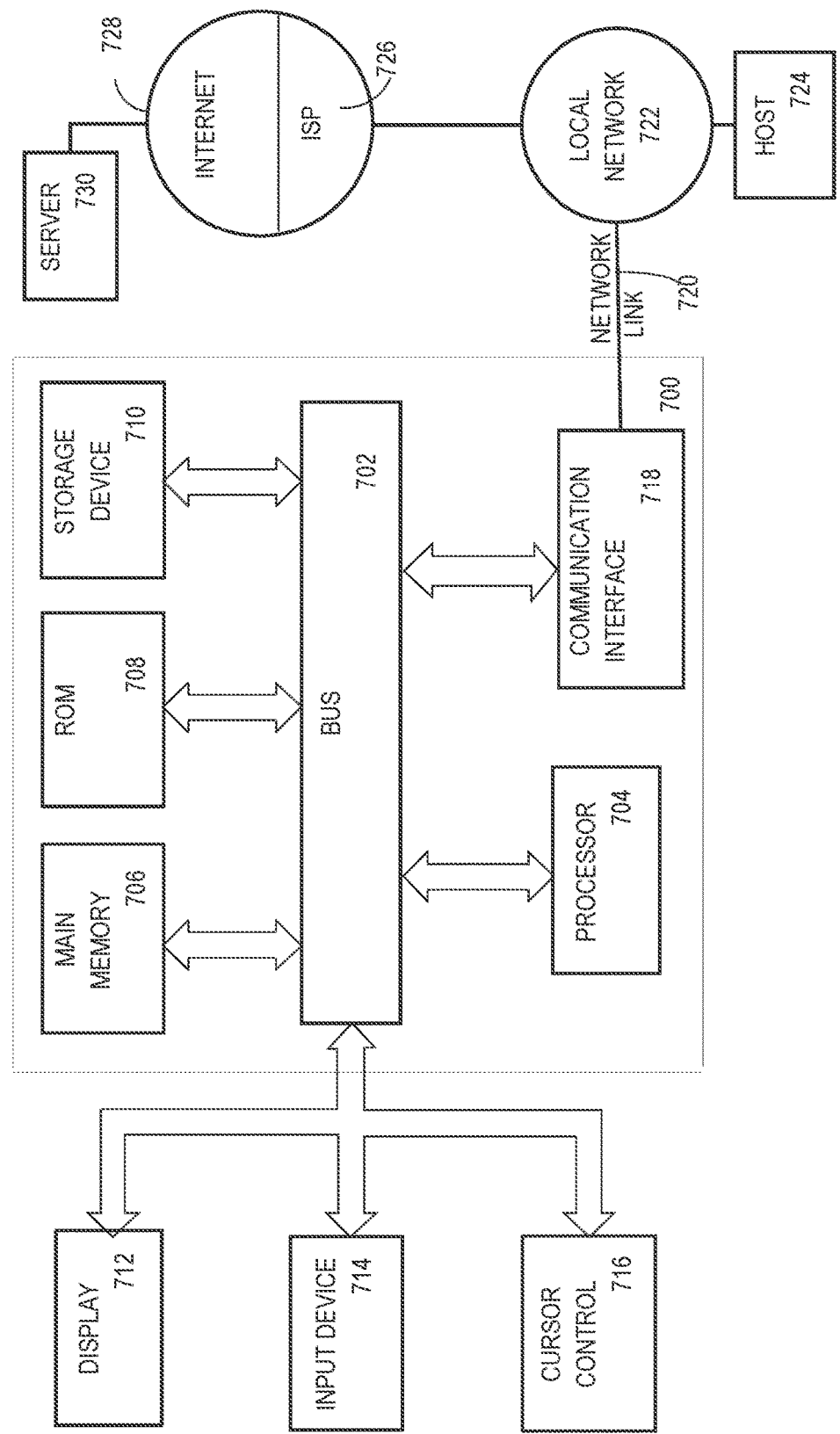
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
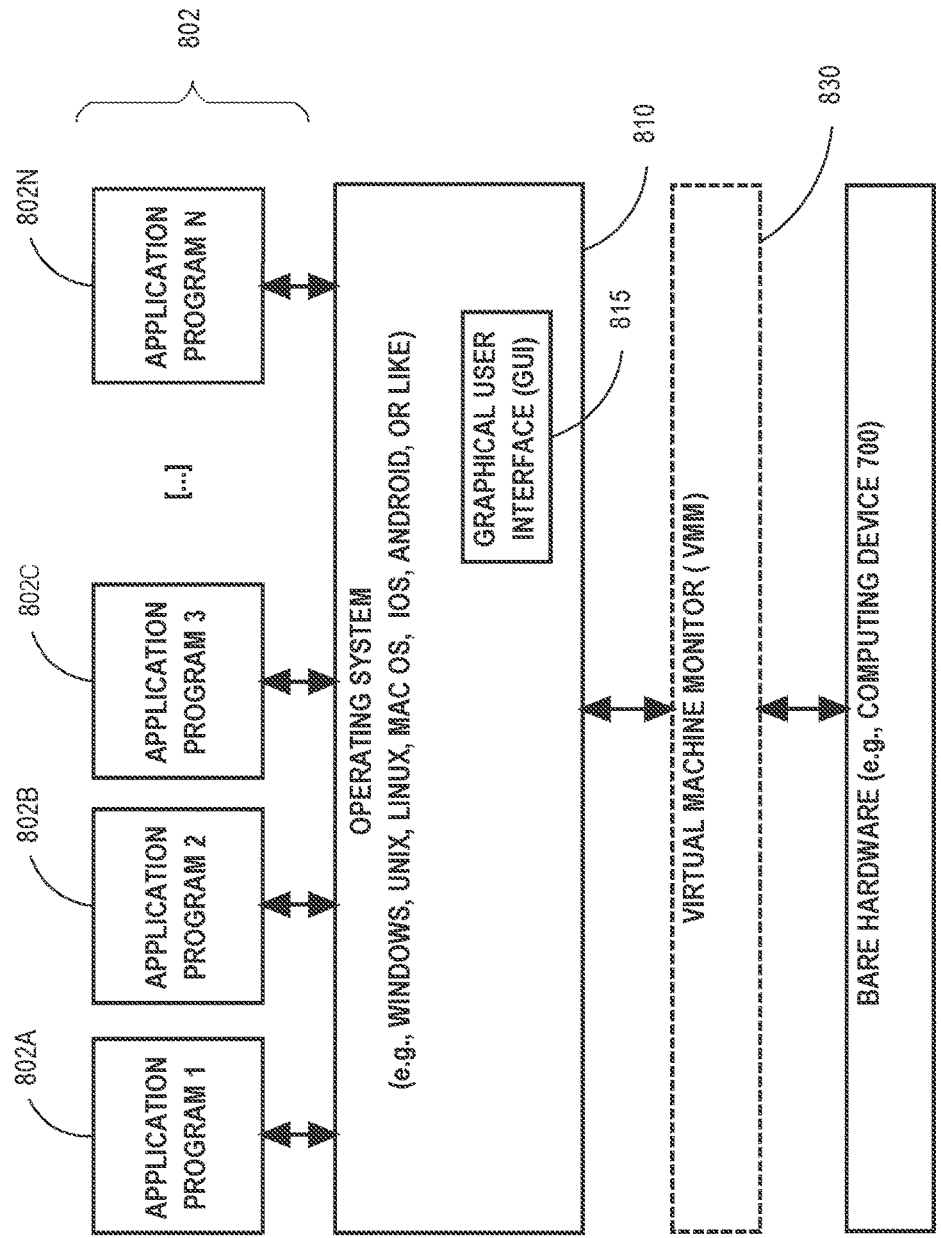
FIG. 8 is a block diagram that illustrates a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 800 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Database Management Systems

Techniques for designing and operating a DBMS, its server instance(s), and its database(s) are presented in related U.S. patent application Ser. No. 16/519,794; now U.S. Pat. No. 11,061,901 INFLUENCING PLAN GENERATION IN THE CONTEXT OF THE TWO PHASE QUERY OPTIMIZATION APPROACH and U.S. patent application Ser. No. 15/897,375 now U.S. Pat. No. 11,126, 611 CODE DICTIONARY GENERATION BASED ON NON-BLOCKING OPERATIONS.

Table Functions

Table functions are functions which produce a set of rows as output. The set of rows produced by a table function may be treated as a "virtual" table. Thus, any database statement used for manipulating data in a table may be used to manipulate data produced by a table function. A database command that includes a table function is referred to herein as a "table function statement".

Table functions were introduced into database systems to support user-defined transformations inside the database server. Thus, a table function is a non-native function registered with and stored inside the database (e.g., by an application or end user). Herein, the terms "table function" and "user-defined table function" are used interchangeably, with the only restriction being that the function is used in a FROM clause of a query and have an argument which specifies a stream of rows from a sub-query (e.g., a ref-cursor argument), as shown by example hereafter. Because table functions are important in the transform phase of an ETL (Extract Transform Load) process of data-warehousing, it is important to support parallelism as a means of making table functions performant and scalable.

One approach to parallelized processing of table functions enforces partitioning of the input stream to table functions, so that each slave process working on the table function receives a "predefined" subset of the input data. The input stream to a table function corresponds to the output stream of the operation below the table function (e.g., the table functions "ref-cursor") in the row-source tree.

Because the logic implemented in a table function is user-defined, it is typical that the table function developer defines the correct and performant partitioning strategy for the function's input stream. Three different partitioning strategies are commonly supported in database systems: ANY, HASH and RANGE.

ANY specifies that the table function is indifferent as to how the input stream to the table function is repartitioned among various table function slaves.

HASH(x) specifies that the input stream to the table function should be repartitioned by a suitable (server-defined) hash function on column x of the ref-cursor.

RANGE(x) specifies that the input stream to the table function should be repartitioned by range on column x of the ref-cursor.

A table function's partitioning method is typically enforced using a data redistribution operation (e.g., a "Table Queue" or "PX SEND") between the table function and the operation below the table function in the row-source tree. In other words, the execution plan for a database statement that includes a table function is constructed to include a redistribution of the data stream output from the table function's ref-cursor, to send subsets of the output data to each of the table function slaves.

For example, a parallel table function row-source (which is represented as a COLLECTION ITERATOR row-source in the execution plan) always had a redistribution Table Queue below. This redistribution operation enforced the redistribution strategy specified by the PARALLEL PARTITION BY clause of the table function, on the rows flowing up from the slaves executing the top row-source corresponding to the ref-cursor query block to the slaves executing the table function (i.e., collection iterator) row-source.

Consider the following simple table function, F, which requires a hash partitioning on one attribute (col1) of its ref-cursor (C_cursor).

```
create function
    F(C_cursor refcursor_type)
    return tab_of_records
    parallel_enable(partition C_cursor
        by HASH(col1)) is
```

```
begin
...
return (record(col1, col2, col3));
end.
```

Thus, function F is to be parallelized by HASH partitioning the rows from cursor "C_cursor" on column "col1."

Now consider the following invocation of the function F:

```
SELECT col1, f_sum_col2
FROM
    TABLE(F(CURSOR(
        SELECT col1, sum(col2) as sum_col2
        FROM tab
        GROUP BY col1))
```

In one approach to such a database statement, the group-by aggregation is typically parallelized using HASH redistribution to slaves based on the GROUP BY columns. Hence, the execution plan for this parallel query has three DFOs, as represented below.

```
PX COORDINATOR
|
(third DFO follows)
COLLECTION ITERATOR (function F)
|
(second DFO follows)
PX SEND (hash on col1)
GROUP BY AGGRN
|
(first DFO follows)
PX SEND (hash on col1)
PX BLOCK
TABLE SCAN (tab)
```

This plan requires two redistributions of data through table queues (i.e., PX SEND), and communication of the redistributed data to other sets of slave processes. Of course, the communications between producer and consumer slave processes, which may execute on different system nodes, require system resources. Further, the more a database system parallelizes its operations, generally, the more complex are the server's query execution plans (e.g., the execution plan includes relatively many redistribution table queues). However, minimization of communications between producer and consumer processes is desirable.

What is claimed is:

1. A method comprising:
defining, in a database dictionary in a relational database management system (RDBMS), a user defined function (UDF);
receiving a database statement that specifies an invocation of the UDF;
generating, based on the database statement that specifies the invocation of the UDF, a tree that represents the database statement; and
executing, without invoking the UDF, an execution plan that accesses data in an offload engine, wherein the execution plan is based on the tree that represents the database statement.

2. The method of claim 1 wherein the execution plan does not reference the UDF.

3. The method of claim 1 further comprising removing, from the execution plan, a reference to the UDF.

4. The method of claim 1 further comprising receiving, from the offload engine, said data formatted as one selected from a group consisting of: a scalar, a record, columnar data, and tabular data.

5. The method of claim 1 further comprising detecting that the execution plan will not cause more than a maximum count of operations in the offload engine.

6. The method of claim 1 further comprising sending, to the offload engine, at least one selected from a group consisting of:
- a single request to perform both of filtration and sorting,
- an integer that indicates an operation to perform,
- a request to detect a maximum value,
- a request to retrieve a computed scalar,
- a request to create a dictionary,
- a request to use a dictionary,
- an identifier of a table,
- tabular data, and
- compressed data.

7. The method of claim 6 wherein said sending the compressed data comprises sending, to the offload engine, data that comprises at least one selected from a group consisting of: dictionary encoded data and run length encoded (RLE) data.

8. The method of claim 6 wherein said sending the request to retrieve the computed scalar comprises sending, to the offload engine, a request to retrieve one selected from a group consisting of: a count of matching records, an average value of a column, and a Boolean that answers an EXISTS query.

9. The method of claim 1 wherein the UDF is a table function that returns a relational table.

10. The method of claim 9 further comprising:
- receiving a second database statement that specifies an invocation of same said UDF;
- accessing, for the second database statement, without accessing data in the offload engine, same said relational table that the UDF returns.

11. One or more computer-readable non-transitory media storing instructions that, when executed by one or more processors, cause:
- defining, in a database dictionary in a relational database management system (RDBMS), a user defined function (UDF);
- receiving a database statement that specifies an invocation of the UDF;
- generating, based on the database statement that specifies the invocation of the UDF, a tree that represents the database statement; and
- executing, without invoking the UDF, an execution plan that accesses data in an offload engine, wherein the execution plan is based on the tree that represents the database statement.

12. The one or more computer-readable non-transitory media of claim 1 wherein the execution plan does not reference the UDF.

13. The one or more computer-readable non-transitory media of claim 11 wherein the instructions further cause removing, from the execution plan, a reference to the UDF.

14. The one or more computer-readable non-transitory media of claim 11 wherein the instructions further cause receiving, from the offload engine, said data formatted as one selected from a group consisting of: a scalar, a record, columnar data, and tabular data.

15. The one or more computer-readable non-transitory media of claim 11 wherein the instructions further cause detecting that the execution plan will not cause more than a maximum count of operations in the offload engine.

16. The one or more computer-readable non-transitory media of claim 11 wherein the instructions further cause sending, to the offload engine, at least one selected from a group consisting of:
- a single request to perform both of filtration and sorting,
- an integer that indicates an operation to perform,
- a request to detect a maximum value,
- a request to retrieve a computed scalar,
- a request to create a dictionary,
- a request to use a dictionary,
- an identifier of a table,
- tabular data, and
- compressed data.

17. The one or more computer-readable non-transitory media of claim 16 wherein said sending the compressed data comprises sending, to the offload engine, data that comprises at least one selected from a group consisting of: dictionary encoded data and run length encoded (RLE) data.

18. The one or more computer-readable non-transitory media of claim 16 wherein said sending the request to retrieve the computed scalar comprises sending, to the offload engine, a request to retrieve one selected from a group consisting of: a count of matching records, an average value of a column, and a Boolean that answers an EXISTS query.

19. The one or more computer-readable non-transitory media of claim 11 wherein the UDF is a table function that returns a relational table.

20. The one or more computer-readable non-transitory media of claim 19 wherein the instructions further cause:
- receiving a second database statement that specifies an invocation of same said UDF;
- accessing, for the second database statement, without accessing data in the offload engine, same said relational table that the UDF returns.

* * * * *

UNITED STATES PATENT AND TRADEMARK OFFICE
CERTIFICATE OF CORRECTION

Page 1 of 2

PATENT NO. : 12,050,602 B2
APPLICATION NO. : 17/505741
DATED : July 30, 2024
INVENTOR(S) : Fender et al.

It is certified that error appears in the above-identified patent and that said Letters Patent is hereby corrected as shown below:

On the Title Page

On page 2, Column 1, under Item (56) other publications, Line 12, delete "perWatt"," and insert -- per Watt", --, therefor.

In the Drawings

On sheet 2 of 8, in FIG. 2, under reference numeral 201, Line 1, delete "( UDF)" and insert -- (UDF) --, therefor.

On sheet 5 of 8, in FIG. 5, under reference numeral 501, Line 2, delete "( UDF);" and insert -- (UDF); --, therefor.

In the Specification

In Column 3, Line 20, delete "RDMBS" and insert -- RDBMS --, therefor.

In Column 6, Line 33, delete "RDMBS" and insert -- RDBMS --, therefor.

In Column 9, Line 54, delete "RDMBS" and insert -- RDBMS --, therefor.

In Column 11, Line 47, delete "RDBS" and insert -- RDBMS --, therefor.

In Column 12, Line 58, delete "RDBMs" and insert -- RDBMSs --, therefor.

In Column 13, Lines 12-13, delete "U.S. U.S." and insert -- U.S. --, therefor.

In Column 13, Line 54, delete "RDMBS" and insert -- RDBMS --, therefor.

Signed and Sealed this
Eleventh Day of February, 2025

Coke Morgan Stewart
*Acting Director of the United States Patent and Trademark Office*

CERTIFICATE OF CORRECTION (continued)
U.S. Pat. No. 12,050,602 B2

In Column 15, Line 53, delete "RDMBS" and insert -- RDBMS --, therefor.

In Column 19, Line 63, delete "( )" and insert -- ( ). --, therefor.

In Column 20, Line 57, delete "thesctx" and insert -- the sctx --, therefor.

In Column 21, Line 5, delete "ANNE)" and insert -- ANAME) --, therefor.

In Column 21, Line 16, delete "intensive" and insert -- intensive. --, therefor.

In Column 21, Line 45, delete "specifiying theright" and insert -- specifying the right --, therefor.

In Column 24, Line 65, delete "802C" and insert -- 802C, --, therefor.